(12) United States Patent
Kuo

(10) Patent No.: US 8,744,492 B2
(45) Date of Patent: Jun. 3, 2014

(54) METHOD OF RESPONDING TO INCOMING CALLS AND MESSAGES WHILE DRIVING

(75) Inventor: Juhang Kuo, Tao-Yuan Hsien (TW)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 170 days.

(21) Appl. No.: 13/308,463

(22) Filed: Nov. 30, 2011

(65) Prior Publication Data

US 2013/0137404 A1    May 30, 2013

(51) Int. Cl.
*H04W 68/00* (2009.01)

(52) U.S. Cl.
USPC .................................... 455/456.3; 455/456.4

(58) Field of Classification Search
USPC ......... 455/410, 413, 414.1, 456.1–456.4, 557
See application file for complete search history.

(56) References Cited

U.S. PATENT DOCUMENTS

| | | | |
|---|---|---|---|
| 6,453,180 B1 * | 9/2002 | Endoh et al. .................. 455/567 |
| 6,687,497 B1 * | 2/2004 | Parvulescu et al. ........... 455/420 |
| 6,718,187 B1 * | 4/2004 | Takagi et al. ............... 455/569.2 |
| 6,973,333 B1 * | 12/2005 | O'Neil ....................... 455/569.2 |
| 7,873,374 B1 * | 1/2011 | O'Neil ........................ 455/456.4 |
| 2002/0168981 A1 * | 11/2002 | Meda ............................. 455/441 |
| 2003/0134627 A1 * | 7/2003 | Himmel et al. ................ 455/419 |
| 2003/0137408 A1 * | 7/2003 | Breiner ....................... 340/425.5 |
| 2004/0147255 A1 * | 7/2004 | Lee ............................. 455/422.1 |
| 2004/0198306 A1 * | 10/2004 | Singh et al. .................... 455/345 |
| 2005/0017860 A1 * | 1/2005 | Tsuji et al. ..................... 340/442 |
| 2005/0064835 A1 * | 3/2005 | Gusler et al. ............... 455/245.1 |
| 2005/0277428 A1 * | 12/2005 | Nathan Brown ........... 455/456.3 |
| 2006/0232472 A1 * | 10/2006 | Roslak .......................... 342/457 |
| 2006/0270463 A1 * | 11/2006 | Copperman ................... 455/567 |
| 2007/0060212 A1 * | 3/2007 | Shah .............................. 455/572 |
| 2007/0072553 A1 * | 3/2007 | Barbera ...................... 455/67.11 |
| 2007/0101426 A1 * | 5/2007 | Lee et al. ......................... 726/22 |
| 2007/0121853 A1 * | 5/2007 | Dawson .................. 379/142.01 |
| 2007/0129083 A1 * | 6/2007 | Creamer et al. ........... 455/456.1 |
| 2007/0142068 A1 * | 6/2007 | Matsuo ......................... 455/515 |
| 2008/0268769 A1 * | 10/2008 | Brown et al. ...................... 455/1 |
| 2009/0003551 A1 * | 1/2009 | MacIsaac ................... 379/88.21 |
| 2009/0098855 A1 * | 4/2009 | Fernandez et al. ............ 455/410 |
| 2009/0149168 A1 * | 6/2009 | McLean ........................ 455/418 |
| 2009/0163243 A1 * | 6/2009 | Barbera ......................... 455/557 |
| 2009/0224931 A1 * | 9/2009 | Dietz et al. .................... 340/670 |
| 2009/0298482 A1 * | 12/2009 | Yen et al. ................... 455/414.2 |
| 2009/0311963 A1 * | 12/2009 | Haverty ....................... 455/63.1 |
| 2009/0312901 A1 * | 12/2009 | Miller et al. .................... 701/36 |
| 2010/0009626 A1 * | 1/2010 | Farley .......................... 455/26.1 |
| 2010/0030463 A1 * | 2/2010 | Tomizawa .................... 701/201 |
| 2010/0035588 A1 * | 2/2010 | Adler et al. ................ 455/414.1 |
| 2010/0041383 A1 * | 2/2010 | Fournier ....................... 455/418 |

(Continued)

*Primary Examiner* — Nathan Taylor
(74) *Attorney, Agent, or Firm* — Winston Hsu; Scott Margo

(57) ABSTRACT

A method of responding to incoming calls while driving includes establishing a connection between an electronic device and a mobile phone to enable the electronic device to receive calls through the mobile phone. The electronic device receives position signals, calculates a speed at which the electronic device is moving, and thereby calculates a driving speed. The electronic device determines whether the driving speed is greater than a speed threshold when the mobile phone has an incoming call. The electronic device presents the user of the electronic device with an option to answer the incoming call when the driving speed is less than the speed threshold, and the electronic device presents the user with the option to answer the incoming call when the driving speed is greater than the speed threshold and when a phone number associated with the incoming call is present in a list of important contact numbers.

18 Claims, 3 Drawing Sheets

(56) References Cited

U.S. PATENT DOCUMENTS

| | | |
|---|---|---|
| 2010/0062788 A1* | 3/2010 | Nagorniak ................ 455/456.1 |
| 2010/0093270 A1* | 4/2010 | Bass .............................. 455/1 |
| 2010/0113073 A1* | 5/2010 | Schlesener et al. .......... 455/466 |
| 2010/0167716 A1* | 7/2010 | Howarter et al. ............ 455/419 |
| 2010/0201478 A1* | 8/2010 | Veen et al. .................... 340/3.1 |
| 2010/0216509 A1* | 8/2010 | Riemer et al. ............... 455/557 |
| 2010/0229217 A1* | 9/2010 | Bhatia ............................ 726/4 |
| 2011/0034185 A1* | 2/2011 | Hartmaier et al. ......... 455/456.4 |
| 2011/0039572 A1* | 2/2011 | Lamb et al. ................ 455/456.1 |
| 2011/0077032 A1* | 3/2011 | Correale et al. ............. 455/466 |
| 2011/0093161 A1* | 4/2011 | Zhou et al. ..................... 701/33 |
| 2011/0105097 A1* | 5/2011 | Tadayon et al. .............. 455/418 |
| 2011/0137520 A1* | 6/2011 | Rector et al. .................. 701/36 |
| 2012/0040647 A1* | 2/2012 | Kato ......................... 455/414.1 |
| 2012/0157069 A1* | 6/2012 | Elliott et al. ................. 455/418 |

* cited by examiner

METHOD OF RESPONDING TO INCOMING CALLS AND MESSAGES WHILE DRIVING

BACKGROUND OF THE INVENTION

1. Field of the Invention

The invention relates to a method of responding to incoming mobile phone calls while driving, and more particularly, to a method of handling and responding to incoming mobile phone calls according to a speed at which a vehicle containing the mobile phone is moving.

2. Description of the Prior Art

With the increasing popularity of portable electronic devices mobile phones have become an indispensible part of many people's lives, causing mobile phone users to carry their mobile phones with them virtually everywhere they go. Indeed, one can often see vehicle drivers talking on a mobile phone, sending or reading text messages, or operating a mobile phone in some way.

However, due to safety concerns, using a mobile phone while driving is not advisable and is even illegal in many areas. Although hands-free devices are available for allowing drivers to take calls while still freeing their hands to drive, there still remains a high level of distraction associated with taking a call using a hands-free device. The act of activating the hands-free device to take a call can cause enough distraction for a driver that an accident may occur. What's more, when the driver receives a call, since the driver cannot easily glance at the mobile phone, the driver often has no way of knowing who the caller is without first answering the call. This leads to unnecessary disturbances for the driver when receiving unimportant phone calls. Therefore, an improved method for handling and responding to phone calls and messages while driving is clearly needed in order to overcome these problems.

SUMMARY OF THE INVENTION

It is therefore one of the primary objectives of the claimed invention to provide a way to help drivers handle and respond to incoming phone calls and messages while driving.

According to an exemplary embodiment of the claimed invention, a method of responding to incoming calls while driving is disclosed. The method includes establishing a connection between a portable electronic device and a mobile phone to enable the portable electronic device to receive calls through the mobile phone, the portable electronic device receiving position signals, calculating a speed at which the portable electronic device is moving, and thereby calculating a driving speed, the portable electronic device determining whether the driving speed is greater than a speed threshold when the mobile phone has an incoming call, the portable electronic device presenting the user of the portable electronic device with an option to answer the incoming call when the driving speed is less than or equal to the speed threshold, and the portable electronic device presenting the user of the portable electronic device with the option to answer the incoming call when the driving speed is greater than the speed threshold and when a phone number associated with the incoming call is present in a list of important contact numbers.

According to another exemplary embodiment of the claimed invention, a method of responding to incoming calls while driving is disclosed. The method includes a portable electronic device receiving position signals, calculating a speed at which the portable electronic device is moving, and thereby calculating a driving speed, the portable electronic device determining whether the driving speed is greater than a speed threshold when the portable electronic device has an incoming call, the portable electronic device presenting the user of the portable electronic device with an option to answer the incoming call when the driving speed is less than or equal to the speed threshold, and the portable electronic device presenting the user of the portable electronic device with the option to answer the incoming call when the driving speed is greater than the speed threshold and when a phone number associated with the incoming call is present in a list of important contact numbers.

It is an advantage that the present invention method determines how to handle incoming phone calls based on a driving speed of the vehicle as calculated by the portable electronic device. In this way, calls will only be taken under the right conditions, thereby maximizing safety while still preventing important calls from being missed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
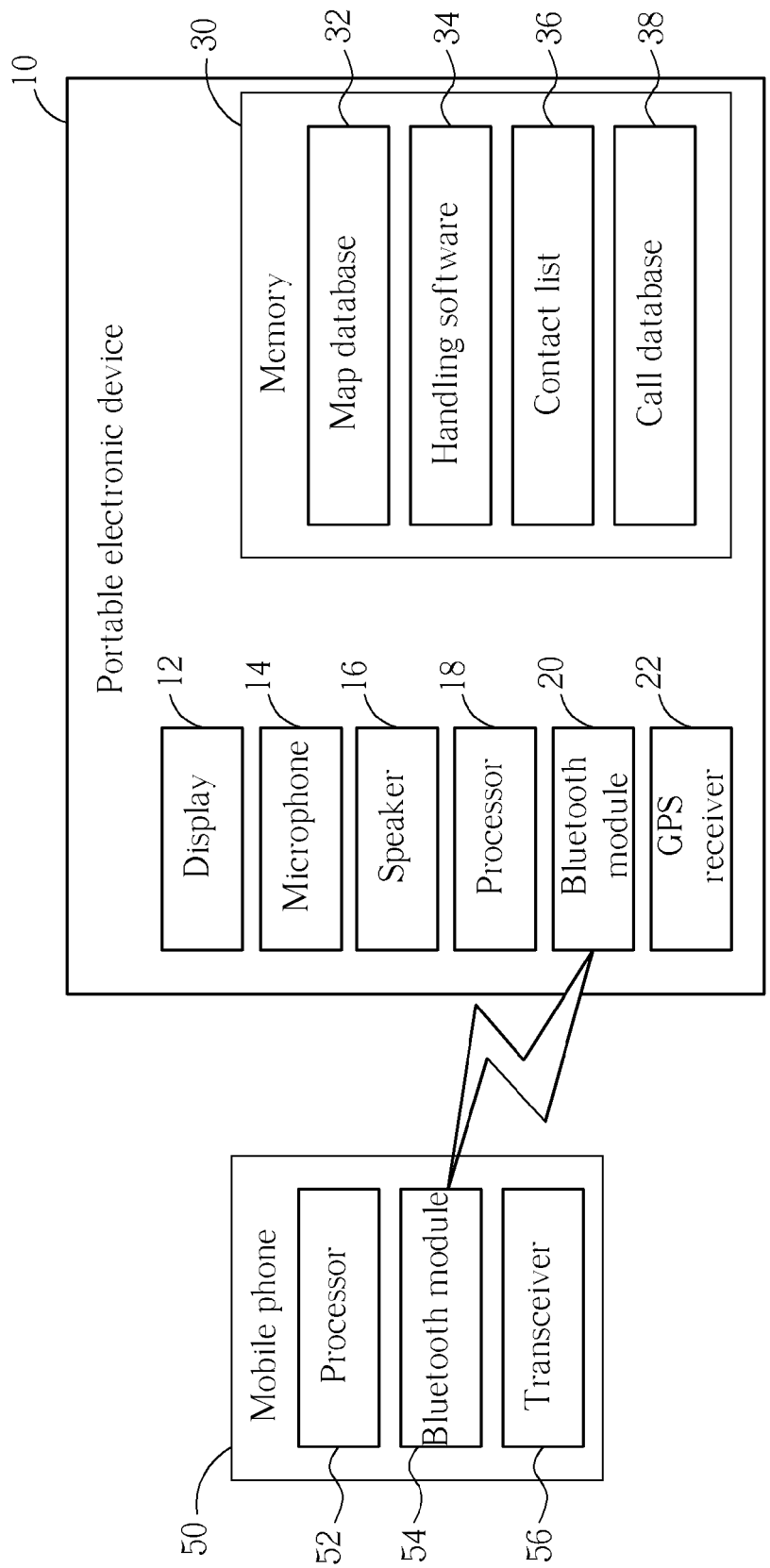
FIG. 1 is a functional block diagram of a portable electronic device interacting with a mobile phone according to the present invention.

Please refer to FIG. 1. FIG. 1 is a functional block diagram of a portable electronic device 10 interacting with a mobile phone 50 according to the present invention. The portable electronic device 10 has a display 12, a microphone 14, and a speaker 16. The display 12 can be a touch-sensitive display for allowing a user of the portable electronic device 10 to input commands and data using the display 12. The portable electronic device 10 also contains a processor 18 for controlling operation of the portable electronic device 10 as well as executing handling software 34 stored in memory 30. A Bluetooth® module 20 of the portable electronic device 10 wirelessly communicates with a Bluetooth® module 54 of the mobile phone 50 for transferring commands and data between the portable electronic device 10 and the mobile phone 50. For instance, the portable electronic device 10 can be used for answering phone calls received on the mobile phone 50 or for displaying text messages received on the mobile phone 50. A Global Positioning System (GPS) receiver 22 receives position signals for indicating the position of the portable electronic device 10. The GPS receiver 22 can use a series of position signals received over time to calculate a current speed of the portable electronic device 10.

The memory 30 also optionally stores a map database 32 for storing map data, address data, parking area information, etc. The memory 30 additionally stores a contact list 36 for storing a list of important contact numbers as well as a call database 38 for storing data associated with received calls and text messages. The call database 38 may store information including the caller's or sender's phone number, a name corresponding to the phone number, the time of the call or message, as well as the contents of messages.

The mobile phone 50 contains a processor 52 for controlling operation of the mobile phone 50, as well as a transceiver 56 for sending and receiving calls and messages over a mobile phone network. The mobile phone 50 contains a wireless communication circuit, such as the Bluetooth® module 54 for facilitating wireless data communication with the portable electronic device 10. Please note that other wireless communication standards other than the Bluetooth® standard can be used. Furthermore, the Bluetooth® module 20 on the portable electronic device 10 and the Bluetooth® module 54 on the mobile phone 50 can instead be replaced by connectors for establishing a wired connection between the portable electronic device 10 and the mobile phone 50.

The portable electronic device 10 can be any device capable of receiving position information such as GPS position signals. For example, the portable electronic device 10 may be a personal navigation device, typically referred to as a GPS device. Other examples of the portable electronic device 10 include a tablet computer, a notebook computer, or even another mobile phone. Any electronic device that can determine the speed at which it is traveling and has the ability to respond to phone calls, either directly or indirectly through a mobile phone, can be used with the present invention. The microphone 14 and the speaker 16 can also instead be replaced by one or more ports through which a headset can be connected.

In brief, the present invention method of responding to phone calls while driving first establishes a connection between the Bluetooth® module 20 of the portable electronic device 10 and the Bluetooth® module 54 of the mobile phone 50. The Bluetooth® module 54 routes voice calls and text messages from the mobile phone 50 to the portable electronic device 10 via the Bluetooth® module 20. The voice calls and text messages are preferably handled in a hands-free manner by the portable electronic device 10. Meanwhile, the GPS receiver 22 in the portable electronic device 10 calculates the vehicle's driving speed based on position signals received over time. The contact list 36 stores the list of important phone numbers of people from which the user of the portable electronic device 10 does not want to miss any incoming phone calls or text messages. When an incoming call is received, depending on the driving speed of the vehicle and depending on whether the phone number associated with the incoming phone call is present on the contact list 36, the incoming phone call is handled in different ways.

This list of important phone numbers stored in the contact list 36 can be modified by adding or deleting the names of contacts. Many mobile phones or other devices offer the ability to group contacts by category, such as friends, colleagues, family, etc. In this situation, the user could also select a category of contacts for use as the designated list of important phone numbers. For instance, the user may only wish to receive calls while driving from contacts that are listed in the family category.

The portable electronic device 10 will automatically handle incoming phone calls when the vehicle is moving except for calls from important phone numbers on the contact list 36. For voice calls received while the vehicle has a driving speed higher than a speed threshold, the display 12 of the portable electronic device 10 will show the incoming call phone number and possibly a name associated with the phone number when the phone number is in the contact list 36. When the details about the incoming call are shown on the display 12 of the portable electronic device 10, the user has the option of answering the phone call using a hands-free phone call. Calls received from all other phone numbers besides those on the contact list 36 when the vehicle has a driving speed higher than the speed threshold will be automatically transferred or routed to voice mail. A record of all incoming calls is kept in the call database 38 so the user can have a convenient way to know which calls are received, missed, or answered while the mobile phone 50 is connected to the portable electronic device 10.

The speed threshold for the road that the user in the vehicle is driving on varies according to the category of the road. The map database 32 may store a plurality of speed thresholds corresponding to different road categories. The different road categories are sorted according to a hierarchy of roads. The hierarchy includes the following categories which are sorted according in decreasing order of typical driving speed on the roads: freeways, arterials, collectors, and local roads. Depending on the category of road that the user is driving on, the corresponding speed threshold is selected. The higher the driving hierarchy, and thus the driving speed, of the road is, the higher the speed threshold will be.

With the present invention, the speed threshold should be lower than the speed limit for the road that the user is driving on. The default values for the various speed thresholds can be adjusted by the user, but preferably the user is only given the ability to lower the various speed thresholds and not to raise the speed thresholds.

As for received text messages, the text messages can be stored in the call database 38 for later viewing. Additionally, the contents of the text message can be read aloud to the driver using text-to-speech synthesis.

When the portable electronic device 10 has determined that the driving speed is now substantially equal to zero, meaning the vehicle has stopped, the portable electronic device 10 alerts the user using a visual or audible alert to check any incoming calls or text messages received while the vehicle was in motion. A call back or text back mechanism can be provided once the vehicle has stopped to make it easier for the driver to return calls or text messages.

Figure 2:
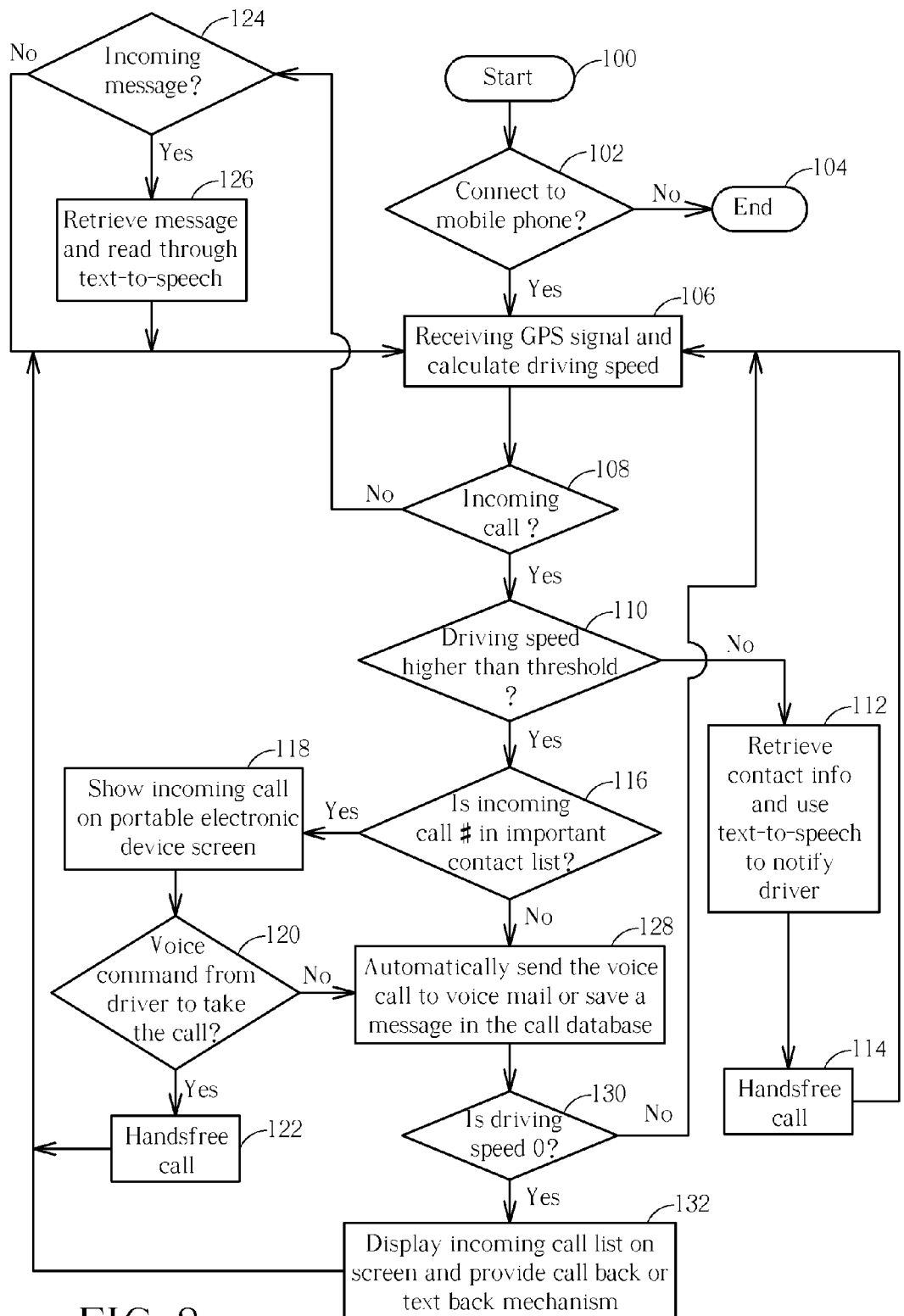
FIG. 2 is a flowchart illustrating the present invention method of responding to incoming phone calls and messages while driving.

Please refer to FIG. 2. FIG. 2 is a flowchart illustrating the present invention method of responding to incoming phone calls and messages while driving. Steps contained in the flowchart will be explained below.

Step 100: Start.

Step 102: Determine if a connection is established between the mobile phone 50 and the portable electronic device 10. The connection can either be a wired connection or a wireless connection made using a wireless technology such as the Bluetooth® standard. As shown in FIG. 1, the Bluetooth® module 20 of the portable electronic device 10 can wirelessly transmit data to and receive data from the Bluetooth® module 54 of the mobile phone 50. If a connection is established, go to step 106. If no connection is established, go to step 104.

Step 104: The process ends since there is no connection between the mobile phone 50 and the portable electronic device 10.

Step 106: The GPS receiver 22 receives a plurality of position signals over time, and thereby calculates the vehicle's driving speed according to the change of the vehicle's position over a period of time.

Step 108: Determine if an incoming call is received. If so, go to step 110. If not, go to step 124.

Step 110: Determine if the driving speed is greater than a speed threshold. If so, go to step 116. If not, go to step 112. The speed threshold is preferably a value greater than zero.

Step 112: Receive the contact information associated with the incoming phone call and notify the driver. The driver is preferably notified about the information associated with the incoming call using text-to-speech synthesis. Other notification methods can also be used, such as visually showing the contact information on the display 12 of the portable electronic device 10. Since the driving speed is less than or equal to the speed threshold, all calls can be handled the same way regardless of whether the calling phone number is located on the contact list 36 or not. That is, the driving speed is slow enough that the driver can be notified about incoming calls, which offers the driver the choice of taking the calls or not.

Step 114: The driver takes the incoming call using a hands-free call. The speaker 16 and the microphone 14 on the portable electronic device 10 or an attached headset can be used to let the driver communicate in a hands-free manner in order to maximize safety. After the call is finished, the process returns to step 106.

Step 116: Determine if the phone number associated with the incoming call is an important number that is located in the contact list 36. If so, go to step 118. If not, go to step 128.

Step 118: Shown the details of the incoming call on the display 12 of the portable electronic device 10. Details such as the phone number or a name associated with the phone number can be shown. The call details can also be read aloud to the driver using text-to-speech synthesis. Even though the vehicle's driving speed is higher than the speed threshold, since the phone number associated with the incoming call is located in the contact list 36 and therefore represents a more important contact, the driver can still be given a chance to take the call.

Step 120: Determine if a voice command is received from the user indicating that the user wishes to take the call. If so, go to step 122. If not, go to step 128. The user may also use other commands besides voice commands. For instance, the user may push a button on the display 12 if the display 12 is a touch screen, or push another button on a housing of the portable electronic device 10.

Step 122: The driver takes the incoming call using a hands-free call. After the call is finished, the process returns to step 106.

Step 124: Determine if an incoming text message is received. If so, go to step 126. If not, return to step 106.

Step 126: Retrieve the incoming text message and read aloud the contents of the text message using text-to-speech synthesis. The text message can also be stored in the call database 38 for later viewing. The process then returns to step 106.

Step 128: The incoming phone call is automatically transferred or routed to voice mail and/or the details of the incoming phone call are saved in the call database 38.

Step 130: Determine if the vehicle's driving speed is substantially equal to zero, implying that the vehicle has stopped. If so, go to step 132. If not, go back to step 106.

Step 132: Display a list of all incoming calls and incoming text messages so the user can have a chance to reply. A call back or text back mechanism can be provided to make it convenient for the driver to return calls or text messages. The process then returns to step 106.

Figure 3:
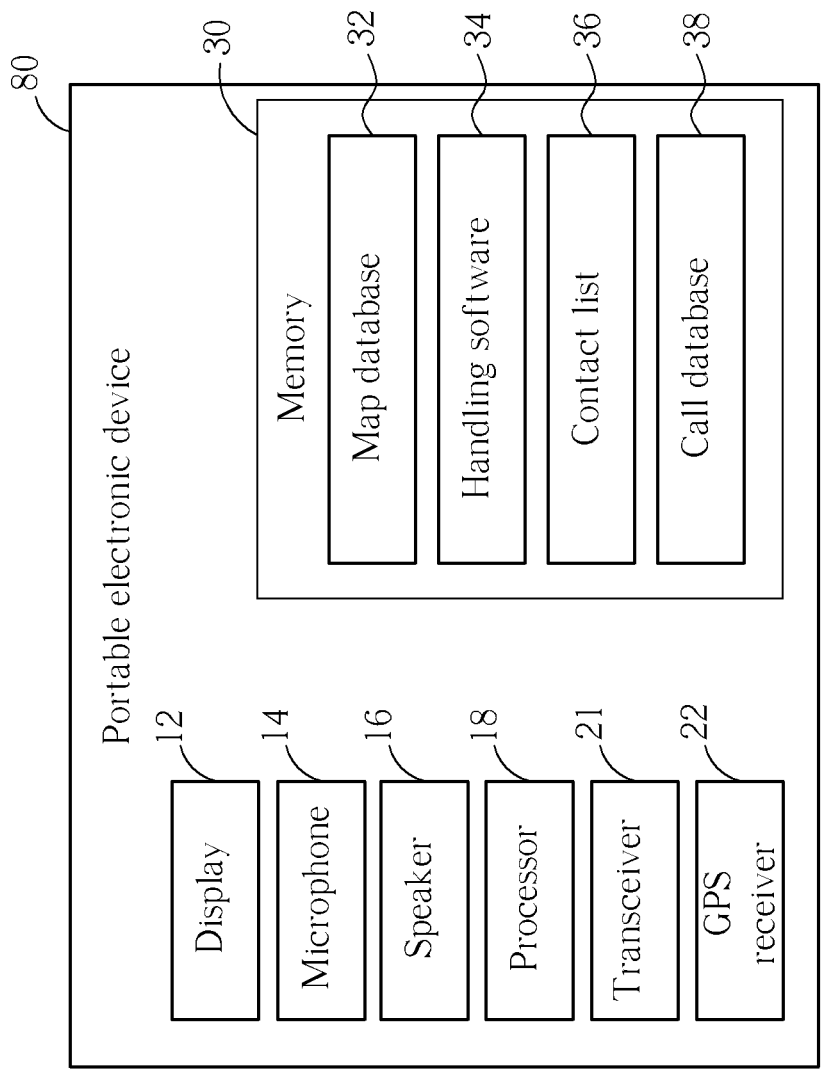
FIG. 3 is a functional block diagram of a portable electronic device having the ability to directly receive phone calls and text messages according to the present invention.

Please refer to FIG. 3. FIG. 3 is a functional block diagram of a portable electronic device 80 having the ability to directly receive phone calls and text messages according to the present invention. Similar to the portable electronic device 10 shown in FIG. 1, the portable electronic device 80 of FIG. 3 has a display, a microphone 14, a speaker 16, a processor 18, a GPS receiver 22, and the memory 30. Differing from the portable electronic device 10, the portable electronic device 80 contains a transceiver 21 for sending and receiving calls and messages over a mobile phone network. Since the portable electronic device 80 already has a transceiver 21 for receiving calls and messages such as text messages and can itself serve as a mobile phone, there is no need for the portable electronic device 80 to connect to any other mobile phone through either a wired connection or a wireless connection such as using a Bluetooth® module.

The present invention method of handling and responding to received calls and messages using the portable electronic device 80 operates in almost the same way as that using the portable electronic device 10. Referring back to the flowchart of FIG. 2, the portable electronic device 80 can omit steps 102 and 104 since no connection needs to be made between the portable electronic device 80 and a mobile phone. In this case, step 100 would proceed directly to step 106. Otherwise, all steps shown in the flowchart of FIG. 2 can be followed.

In summary, the present invention provides a convenient and safe way to handle incoming phone calls and messages based on a driving speed of the vehicle calculated by the portable electronic device. In this way, calls will only be taken when it is safer to do so, and calls from important phone numbers will be given priority. The present invention thereby maximizes safety while still preventing important calls from being missed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of responding to incoming calls while driving, the method comprising:

establishing a connection between a portable electronic device and a mobile phone to enable the portable electronic device to receive calls via the mobile phone for handling the received calls on the portable electronic device;

determining the mobile phone has an incoming call;

the portable electronic device determining a driving speed in response to determining the mobile phone has the incoming call, wherein the portable electronic device receives position signals, calculates a speed at which the portable electronic device is moving, and thereby calculates the driving speed;

the portable electronic device presenting a user of the portable electronic device with an option to answer the incoming call when the driving speed is less than or equal to a speed threshold;

the portable electronic device presenting the user of the portable electronic device with the option to answer the incoming call when the driving speed is greater than the speed threshold and when a phone number associated with the incoming call is present in a list of important contact numbers;

determining that the driving speed is substantially equal to zero; and in response to determining that the driving speed is substantially equal to zero:

alerting the user to check incoming calls and messages;

displaying a list of incoming calls not answered by the user of the portable electronic device; and providing a mechanism for the user of the portable electronic device to return calls or messages.

2. The method of claim 1, further comprising upon determining the driving speed is greater than the speed threshold and determining the phone number associated with the incoming call is not present in a list of important contact numbers, the portable electronic device recording details of the incoming call in a database or transferring the incoming call to voice mail.

3. The method of claim 1, wherein the portable electronic device presenting the user of the portable electronic device with the option to answer the incoming call when the driving speed is greater than the speed threshold and when the phone number associated with the incoming call is present in a list of important contact numbers further comprises:
   presenting information associated with the incoming call on a display of the portable electronic device when the mobile phone has the incoming call;
   receiving a command from the user of the portable electronic device indicating the user wishes to answer the incoming call; and
   presenting the user with the option to answer the incoming call upon receiving the command from the user.

4. The method of claim 3, wherein the command from the user indicating the user wishes to answer the incoming call is a voice command.

5. The method of claim 1, wherein the portable electronic device presenting the user of the portable electronic device with the option to answer the incoming call when the driving speed is greater than the speed threshold and when the phone number associated with the incoming call is present in the list of important contact numbers further comprises the user answering the incoming call as a hands-free call.

6. The method of claim 1, wherein the portable electronic device presenting the user of the portable electronic device with the option to answer the incoming call when the driving speed is less than or equal to the speed threshold further comprises informing the user about information associated with the incoming call using text-to-speech synthesis.

7. The method of claim 1, wherein the portable electronic device presenting the user of the portable electronic device with the option to answer the incoming call when the driving speed is less than or equal to the speed threshold further comprises the user answering the incoming call as a hands-free call.

8. The method of claim 1, further comprising:
   the mobile phone receiving a text message; and
   the portable electronic device reading aloud the contents of the text message using text-to-speech synthesis.

9. The method of claim 1, wherein the portable electronic device stores a plurality of speed thresholds corresponding to different road categories, and the speed threshold is selected according to a category of road that the user is driving on, the selected speed threshold being lower than a speed limit for the road that the user is driving on.

10. A method of responding to incoming calls while driving, the method comprising:
    determining the portable electronic device has an incoming call;
    a portable electronic device determining a driving speed in response to determining that the portable electronic device has the incoming call, wherein the portable electronic device receives position signals, calculates a speed at which the portable electronic device is moving, and thereby calculates the driving speed;
    the portable electronic device presenting a user of the portable electronic device with an option to answer the incoming call when the driving speed is less than or equal to a speed threshold;
    the portable electronic device presenting the user of the portable electronic device with the option to answer the incoming call when the driving speed is greater than the speed threshold and when a phone number associated with the incoming call is present in a list of important contact numbers;
    determining that the driving speed is substantially equal to zero; and
    in response to determining that the driving speed is substantially equal to zero:
      alerting the user to check incoming calls and messages;
      displaying a list of incoming calls not answered by the user of the portable electronic device; and
      providing a mechanism for the user of the portable electronic device to return calls or messages.

11. The method of claim 10, further comprising upon determining the driving speed is greater than the speed threshold and determining the phone number associated with the incoming call is not present in a list of important contact numbers, the portable electronic device recording details of the incoming call in a database or transferring the incoming call to voice mail.

12. The method of claim 10, wherein the portable electronic device presenting the user of the portable electronic device with the option to answer the incoming call when the driving speed is greater than the speed threshold and when the phone number associated with the incoming call is present in a list of important contact numbers further comprises:
    presenting information associated with the incoming call on a display of the portable electronic device when the portable electronic device has the incoming call;
    receiving a command from the user of the portable electronic device indicating the user wishes to answer the incoming call; and
    presenting the user with the option to answer the incoming call upon receiving the command from the user.

13. The method of claim 12, wherein the command from the user indicating the user wishes to answer the incoming call is a voice command.

14. The method of claim 10, wherein the portable electronic device presenting the user of the portable electronic device with the option to answer the incoming call when the driving speed is greater than the speed threshold and when the phone number associated with the incoming call is present in the list of important contact numbers further comprises the user answering the incoming call as a hands-free call.

15. The method of claim 10, wherein the portable electronic device presenting the user of the portable electronic device with the option to answer the incoming call when the driving speed is less than or equal to the speed threshold further comprises informing the user about information associated with the incoming call using text-to-speech synthesis.

16. The method of claim 10, wherein the portable electronic device presenting the user of the portable electronic device with the option to answer the incoming call when the driving speed is less than or equal to the speed threshold further comprises the user answering the incoming call as a hands-free call.

17. The method of claim 10, further comprising:
    the portable electronic device receiving a text message; and
    the portable electronic device reading aloud the contents of the text message using text-to-speech synthesis.

18. The method of claim 10, wherein the portable electronic device stores a plurality of speed thresholds corresponding to different road categories, and the speed threshold is selected according to a category of road that the user is driving on, the selected speed threshold being lower than a speed limit for the road that the user is driving on.

* * * * *